June 17, 1941.   M. M. CANNON, JR   2,246,461
OPERATING MECHANISM FOR GLASS FEEDER PLUNGERS
Filed Aug. 25, 1938
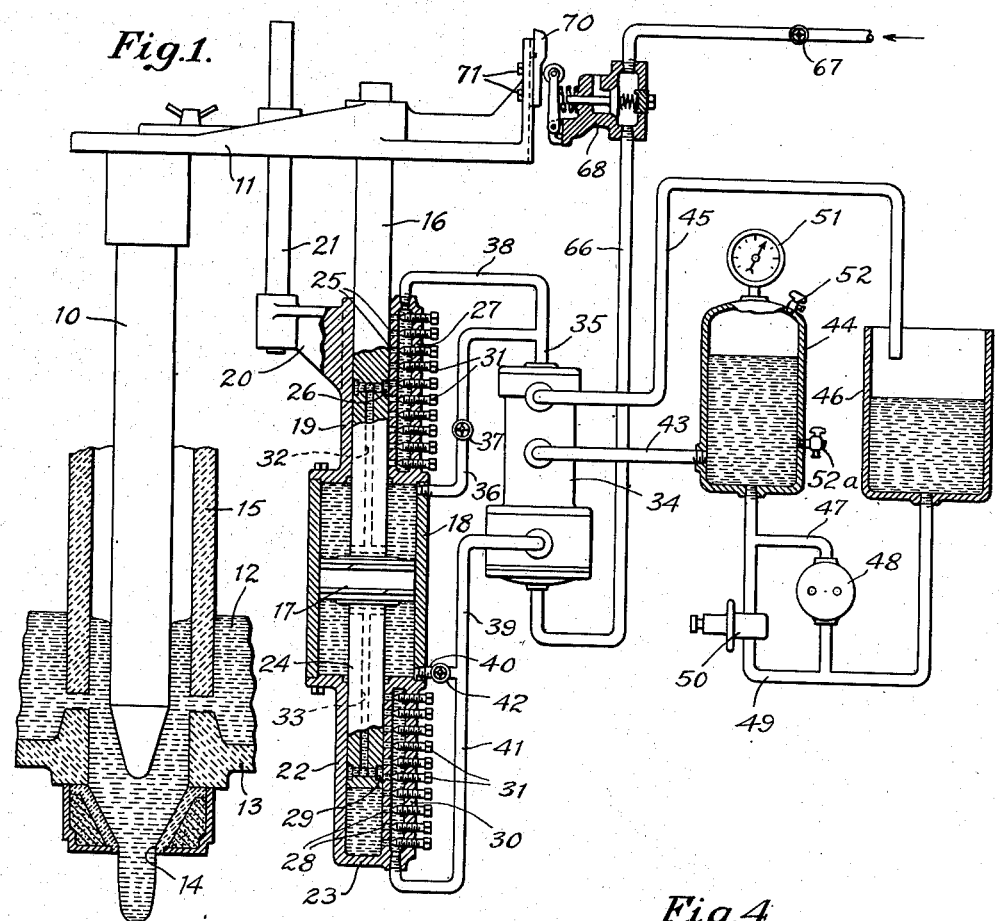
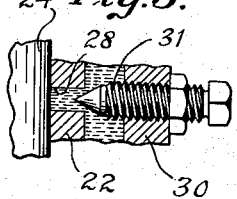
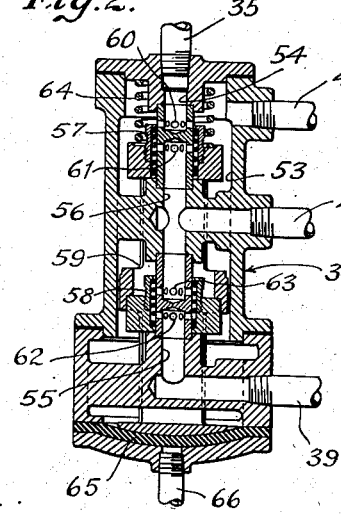
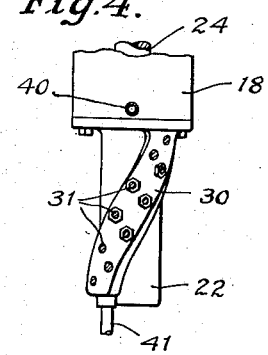
Inventor:
Madison M. Cannon, Jr
by Brown & Parham
Attorneys.

Patented June 17, 1941

2,246,461

UNITED STATES PATENT OFFICE 2,246,461

OPERATING MECHANISM FOR GLASS FEEDER PLUNGERS

Madison M. Cannon, Jr., West Hartford, Conn., assignor to Hartford-Empire Company, Hartford, Conn., a corporation of Delaware Application August 25, 1938, Serial No. 226,618

8 Claims. (Cl. 49—55)

This invention relates generally to improvements in mechanisms for operating a reciprocable part or member, and more particularly to improvements in pressure fluid-actuated mechanisms for reciprocating glass feeder plungers.

An object of the invention is to provide a feeder plunger operating mechanism which can be adjusted during the operation of such plunger to vary the character of the stroke of the plunger at practically any place along the length of that stroke.

A further object of the present invention is to provide a pressure fluid-actuated mechanism for effecting reciprocatory or working strokes of a glass feeder plunger in such manner and by such means that the speed of practically any portion of the stroke of the plunger in either direction can be regulated, and such regulation can be effected more positively and accurately than is possible by the use of any prior pressure fluid-actuated plunger operating mechanism.

A further object of the invention is to provide a pressure fluid-actuated feeder plunger operating mechanism which will permit a relatively great and relatively flexible or variable range of adjustments of the speed of each of the reciprocatory strokes of the plunger.

A further object of the invention is the provision of a pressure fluid-actuated mechanism for effecting the reciprocatory or working strokes of a glass feeder plunger in such manner and by such means that the speed of practically any portion of the stroke of the plunger in either direction can be regulated independently of other portions of that stroke, and of the other or reverse stroke of the plunger.

A further object of the invention is the provision of a pressure fluid-actuated mechanism for reciprocating a glass feeder plunger which will be reliable in use, comprise but relatively few moving parts, not likely to get out of order easily, and thoroughly practical commercially.

Other objects and advantages of the invention will hereinafter be pointed out or will become apparent from the following description of practical embodiments thereof, as shown in the accompanying drawing, in which Figure 1 is a view partly diagrammatic, with other parts in vertical section, showing an assembly of parts embodying the invention as operatively connected with a glass feeder plunger, only a fragmentary portion of the feeder structure being shown.

Fig. 2 is a relatively enlarged vertical section through a control valve that is included in the operating mechanism of Fig. 1.

Fig. 3 is a fragmentary sectional view showing one of the exhaust ports between an end extension of the power cylinder and an associate exhaust manifold of the mechanism shown in Fig. 1, together with a needle valve for controlling such port, and Fig. 4 is a fragmentary view which shows in side elevation a modified form of exhaust manifold for an end extension of the power cylinder.

In carrying out the present invention, I prefer to make use of a suitable liquid, such as water, as the primary pressure fluid medium for actuating the piston of the operating or power motor of the device.

The invention provides novel structural arrangements for regulably controlling the exhaust of such incompressible fluid medium in advance of the piston of the power device and thus permits a very extensive and flexible range of control of the speed of such piston and of the feeder plunger with which the piston is operatively connected.

Referring now particularly to Fig. 1, a glass feeder plunger 10 is supported by an overhead arm or carrier 11 so that this plunger depends into the glass 12 in a feeder forehearth 13 in axial alignment with a feeder outlet 14. A refractory tube 15 for controlling flow of glass to the feed well above the outlet 14 may depend into the glass 12 in concentric relation with the plunger 10 and be supported by any suitable known means (not shown).

The structure shown comprises portions of a well-known glass feeder. In the operation of such a feeder, the strokes of the plunger 10 toward and away from the outlet may be employed to control the feeding of glass from the supply body in the forehearth to control the formation of successive mold charge masses of glass in suspension from the outlet and ultimately the shape of the mold charges which are severed from such masses.

The present invention provides an operating mechanism for the feeder plunger which will allow a maximum control of the speed of the plunger at any portion of its stroke in either direction, and hence affords a desirable control of the shape of the glass mold charges produced by the feeder.

As shown in Fig. 1, the plunger supporting arm or carrier 11 is carried by an upright rod 16 which in turn is carried by a piston 17 that is reciprocable in a vertical cylinder 18. The cylinder 18 has an upwardly extending tubular end extension 19 through which the rod 16 extends and with which such rod is in close sliding contact. A bracket 20 on the extension 19 may carry an upstanding guide pin or rod 21 which extends through the arm or carrier 11 in sliding relation therewith and thus prevents accidental or unintended angular movement of the carrier 11 around the axis of the piston rod 16.

The cylinder 18 also has a downwardly extending tubular end extension 22 at its lower end in alignment with the upper extension 19. This lower extension is closed at its bottom or lower end as indicated at 23. A second piston rod, indicated at 24, extends downwardly from the piston 17 and fits slidably in the lower tubular extension 22.

The upper tubular extension 19 of the cylinder 18 may have closely spaced outlet or exhaust ports 25 in a wall thereof, arranged in a vertical series, for successively establishing communication between an annular exhaust channel 26 in a portion of the rod 16 and an exhaust manifold 27. The exhaust manifold may extend longitudinally of the tubular extension 19 for practically the full length thereof, as shown in Fig. 1. A similar arrangement of exhaust ports 28 may be provided in a wall of the lower tubular extension 22 for successively establishing communication between an annular exhaust channel 29 in the rod 24 and an exhaust manifold 30 which extends longitudinally of the lower tubular extension 22.

Each of the ports 25 and 28 may be controlled by a needle valve 31 which may be threaded through a suitable opening in the wall of the associate manifold, as shown to advantage in Fig. 3. It will be obvious that the volume of liquid permitted to pass through each port 25 or 28 may be independently adjusted by adjustment of the needle valve 31 for that particular port.

The exhaust channel 26 in the rod 16 is connected with the interior of the cylinder 18 by connecting passages in the rod 16, as generally indicated at 32. Similarly, the exhaust channel 29 in the rod 24 is connected with the interior of the cylinder 18 by connecting passages, indicated at 33, in the rod 24.

A valve 34 is provided for controlling the admission of liquid under pressure to the opposite ends of the cylinder 18 and the return of liquid from the exhaust manifolds to a source of supply. The valve 34 is connected at one end with a liquid supply and exhaust pipe 35 having a liquid intake or supply branch 36 connected with the upper part of the cylinder 18. A check valve 37 prevents exhaust of liquid from the cylinder through the pipe 36. A second branch, designated 38, of the pipe 35 is connected with the upper end of the exhaust manifold 27 and serves primarily as a liquid exhaust or return pipe.

A combined liquid supply and return or exhaust pipe 39 connects the lower portion of the control valve 34 with a liquid intake or supply branch pipe 40 and a branch pipe 41 which is primarily a liquid return or exhaust pipe. The branch 40 is connected to the lower portion of the cylinder 18 and is provided with a check valve 42 for preventing exhaust of liquid therethrough while the branch 41 is connected to the lower portion of the exhaust manifold 30.

A liquid supply pipe 43 leads from a pressure reservoir 44 for liquid to the control valve 34, and a liquid return or exhaust pipe 45 leads from the control valve 34 to the main liquid supply reservoir 46. A conduit 47 provided with a pump 48 supplies liquid from the reservoir 46 continuously, to the pressure reservoir 44, a by-pass line 49 provided with a relief valve 50 serving to return excess liquid to the pump line when a predetermined pressure, for which the valve 50 is set, is exceeded in the pressure reservoir 44. The latter may be provided with a gauge 51 for indicating the pressure therein, and with a normally closed air vent 52 and a normally closed drain fitting 52a.

The arrangement is such that liquid will be supplied at a constant pressure from the pressure reservoir 44 through the conduit 43 to the control valve 34, and thence to the opposite ends of the cylinder 18, in turn, for reciprocating the piston 17 in the cylinder 18. The strokes of such piston may, however, be independently controlled as to speed at practically all portions of such strokes by adjustments of the needle valves 31 which control the exhaust or return of liquid from the opposite ends of the cylinder 18 to the control valve 34. These adjustments obviously can be made during operation of the feeder plunger.

The control valve may be of any suitable known structure which will provide the results just described, and the details of such a control valve do not per se form part of the present invention. As shown in Fig. 2 the control valve 34 has an exhaust chamber 53 connected directly with the liquid exhaust or return pipe 45. A combined exhaust and liquid supply chamber 54 communicates directly with the upper pipe 35 and a similar chamber 55 communicates directly with the pipe 39. A chamber 56 between the chambers 54 and 55 is connected directly with the liquid intake or supply pipe 43. A pair of sleeve valves 57 and 58, respectively, are operated in unison by the valve stem structure 59. The valve 57 controls the ports or orifices 60 and 61 and the valve 58 controls the ports or orifices 62, 63. The arrangement is such that the valve 57 will be in position to permit liquid flow communication between the chamber 54 and the exhaust chamber 53 only, this being effected through the orifices 60, when the valve 58 is in position to permit communication between the intake or supply chamber 56 and the chamber 55 only, this being effected through the orifices 63, the controlling valve 58 and orifices 62. When the valves 57 and 58 are in their reversed operating positions, the liquid supply or intake chamber 56 will be placed in communication with the chamber 54 through the orifices 61, valve 57, and orifices 60, while the chamber 55 will then be in communication (through orifices 62) with the exhaust chamber 53 only.

A spring 64, acting on the stem structure 59, tends to maintain the valves 57 and 58 in their first described operating positions, as shown in Fig. 2, while a diaphragm 65 is operable by a pressure fluid, such as air supplied through the air pipe 66, to move the valves 57 and 58 to their second described or reversed operating positions. The air line 66 may be provided with a suitable check valve, indicated at 67, so that after each operation of a suitable timer (not shown) to supply air under pressure to the line 66, such air will be entrapped against the diaphragm to maintain the valves 57 and 58 in their second described operating positions until the pressure of such entrapped air is relieved by operation of a trip valve 68. This trip valve, which controls the limit of the downward stroke of the plunger 10, may be actuated by a suitable actuator or cam finger 70 on a moving part of the operating mechanism. As shown, the actuator 70 is carried by the arm or carrier 11, from which the plunger 10 is suspended. The position of the actuator 70 on its arm or carrier may be adjusted, as by manipulation of the fastening screws 71 and manual adjustment of the actuator so that the downward movement of the plunger 10 will be halted at a predetermined, variable distance from the outlet.

From the foregoing description of the various parts of the particular structural embodiment of the invention shown in the drawing, it will be obvious that the speed of practically any portion of the stroke of the plunger 10 in either direction may be varied within a considerable range by suitable adjustment of the particular needle valve 31 that controls the exhaust of liquid from the cylinder 18 during that particular portion of such stroke. It also will be clear that by various adjustments of the different needle valves 31, widely different variations in speed can be effected during different portions of each of the strokes of the plunger 10.

Since the pressure fluid employed is incompressible, the control of the rate of exhaust at any given time, effected by the adjustment of one or more of the needle valves, affords a positive and accurate control of the speed of the stroke of the plunger 10 at that particular time.

If desired, the manifolds which are associated with the exhaust end extensions of the cylinder 18 may be arranged spirally around such extensions, as indicated for the extension 22 in Fig. 4, which is there shown as being provided with a spiral exhaust manifold 130. With a spiral manifold, the pitch of which may vary considerably from that shown in Fig. 4, the number of valve controlled exhaust ports per unit of linear measure between the interior of the tubular cylinder end extension and the manifold may be increased as desired without crowding of adjacent individual needle valves to such an extent as would make adjustment of such valves difficult or inconvenient if the manifold were parallel with the controlled cylinder end extension. The principle of control by the use of the modified form of construction is the same as that of the form of construction shown in Fig. 1.

Various changes from the illustrative embodiments of the invention shown in the drawing may be made without departing from the spirit and scope of the invention.

I claim:

1. Mechanism for operating a reciprocable member to be operated, comprising a cylinder, a piston reciprocable in the cylinder and operatively connected to the reciprocable member to be operated, means for supplying pressure fluid to the opposite ends of the cylinder alternately to reciprocate the piston in the cylinder, and means for varying the speed of either stroke of the piston at any one of numerous different points along the length of each of such stroke independently of a change of speed of the piston during the remainder of the stroke.

2. Mechanism for operating a reciprocable member to be operated comprising a cylinder, a piston reciprocable in the cylinder and operatively connected to the reciprocable member to be operated, means for supplying pressure fluid to the opposite ends of the cylinder alternately to reciprocate the piston in the cylinder, and means operable at will to vary the speed of a stroke of the piston at any one of a plurality of different points along the length of such stroke independently of a change of the speed of the piston during the remainder of such stroke.

3. Mechanism for operating a reciprocable plunger of a glass feeder, comprising a cylinder, a piston reciprocable in the cylinder and connected to the plunger to move it in unison with the piston, means for supplying liquid under a predetermined constant pressure alternately to opposite ends of the cylinder, means for effecting controlled exhaust of the liquid under pressure from each of the opposite ends of the cylinder and means for varying said controlled exhaust during any one of a plurality of successive portions of the stroke of the piston toward either of the opposite ends of said cylinder independently of any change of said exhaust during the remainder of said stroke.

4. Mechanism for operating a reciprocable plunger of a glass feeder, comprising a cylinder, a piston reciprocable in the cylinder and connected to the plunger to move it in unison with the piston, means for supplying pressure fluid alternately to the opposite ends of said cylinder, said cylinder having hollow end extensions, rods extending from opposite ends of the piston and having portions working in said extensions, exhaust manifolds associated with said end extensions and communicating therewith through series of closely adjacent ports located at different places along the lengths of said extensions, said rods having passages constructed and arranged to effect communication between opposite ends of the cylinder and said ports as the piston reciprocates in the cylinder, means for separately controlling said ports, and means for conducting pressure fluid from each of said manifolds when pressure fluid is being supplied to the opposite end of the cylinder.

5. In a glass feeder, the combination with a reciprocable glass feed regulating plunger, of a cylinder, a piston reciprocable in the cylinder, a rod extending from the piston beyond one end of the cylinder, a carrier on said rod connected to the plunger to support it and move it in unison with the piston, a second rod extending from the piston beyond the opposite end of the cylinder, hollow extensions at opposite ends of the cylinder surrounding said rods and in close sliding contact therewith, means for supplying pressure fluid to opposite ends of the cylinder alternately to reciprocate the piston, exhaust manifolds associated with said end extensions of the cylinder, said end extensions having vertically spaced, closely adjacent exhaust ports establishing communication between the interior of said end extensions and said manifolds, said rods having passages communicating at their inner ends with the interior of the cylinder at opposite sides of the piston and at their outer ends with the individual ports of the opposite end extensions of the cylinder in turn as the piston is reciprocated in the cylinder, individual valve means for the respective ports, means for conducting pressure fluid from each of said manifolds when pressure fluid is being supplied to the opposite end of the cylinder, and adjustable means for limiting the time pressure fluid is being supplied to one end of the cylinder and exhausted from the manifold at the opposite end of the cylinder.

6. Mechanism of the character described, comprising a cylinder, a piston reciprocable in the cylinder, rods extending from the piston through and beyond opposite end portions of the cylinder, hollow extensions at opposite ends of the cylinder in close sliding contact with said rods, manifolds associated with said extensions and each having a wall in common with the associate extension, closely adjacent ports in the common wall between each manifold and its associate end extension, said ports being spaced longitudinally of said common wall, means for supplying pressure fluid to the opposite ends of the cylinder to reciprocate the piston and its rods, said rods having passages communicating at their inner ends with the interior of the cylinder at opposite sides of the piston and communicating at their outer ends with the individual ports in turn as the piston is reciprocated in the cylinder, adjustable separate valves for the respective ports, and a control valve for controlling the supply of the pressure fluid to the opposite ends of the cylinder and connected with the manifolds to control exhaust of pressure fluid from said manifolds.

7. Mechanism of the character described, comprising a cylinder, a piston reciprocable therein, rods extending from the piston beyond the opposite ends of the cylinder, hollow extensions at the ends of the cylinder surrounding and in close sliding contact with said rods, manifolds associated with said end extensions and each having a wall common with its associate extension, closely adjacent ports in said common wall spaced longitudinally thereof, said rods being formed with passages therein through which liquid may flow between the portions of the cylinder at opposite sides of the piston and said manifolds through the spaced ports in sequence, beginning with the ports nearest to the ends of the cylinder, as said piston reciprocates in said cylinder, valves for the individual ports, a control valve connected with opposite ends of the cylinder and with the manifolds for controlling flow of liquid under pressure to the opposite ends of the cylinder and exhaust of liquid under pressure from said manifolds, a liquid supply reservoir, a liquid return pipe from said control valve to said reservoir, a pressure liquid reservoir connected with the control valve, and means connecting said liquid supply reservoir and the pressure liquid reservoir and operable to maintain substantially constant pressure conditions in said pressure liquid reservoir.

8. In a glass feeder, a container for molten glass having a glass discharge outlet in its bottom, a plunger adapted for reciprocation in the glass in the container toward and away from the outlet, and means for supporting and reciprocating said plunger, said means including a hydraulic motor having a reciprocating piston operatively connected to the glass feeder plunger to reciprocate the latter in unison with the hydraulic motor piston, and means adjustable during the continued operation of said piston and said plunger in unison to vary the speed of a stroke of said piston selectively at any one of a plurality of different parts of such stroke independently of a change of the speed of the piston during the remainder of such stroke and thereby to effect a like change in the corresponding stroke of the feeder plunger while the feeder plunger is reciprocating to vary the speed of a stroke of the plunger selectively at one or a plurality of different parts of such stroke.

MADISON M. CANNON, Jr.

CERTIFICATE OF CORRECTION.

Patent No. 2,246,461. June 17, 1941.

MADISON M. CANNON, JR.

It is hereby certified that error appears in the printed specification of the above numbered patent requiring correction as follows: Page 4, second column, line 31, claim 8, after "plunger" insert a period and beginning with "while the" strike out all to and including the word and period "stroke." in line 34, same claim; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.